March 21, 1933. O. SIMMEN 1,902,528
WATER COOLED INTERNAL COMBUSTION ENGINE CYLINDER
Filed March 19, 1931
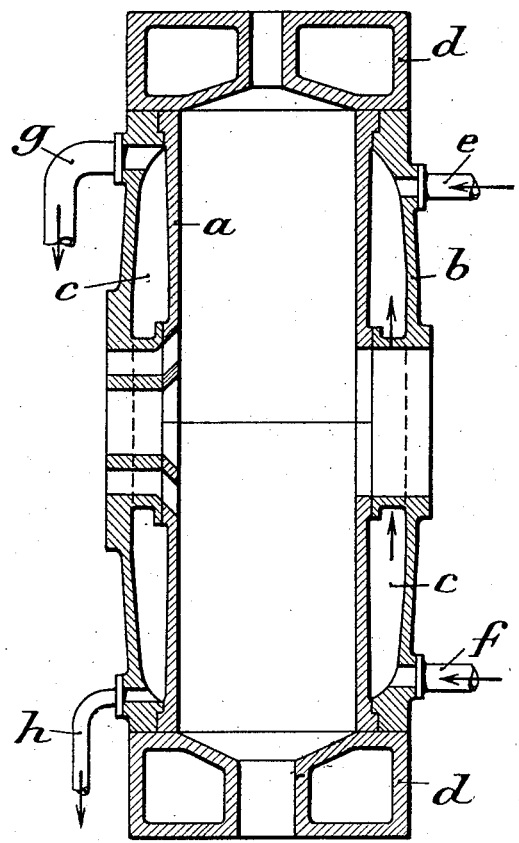
INVENTOR:
Oscar Simmen
BY
Pennie Davis Marvin & Edmonds
ATTORNEYS.

Patented Mar. 21, 1933

1,902,528

UNITED STATES PATENT OFFICE

OSCAR SIMMEN, OF ERLACH, SWITZERLAND, ASSIGNOR TO FIRM SULZER FRERES SOCIETE ANONYME, OF WINTERTHUR, SWITZERLAND

WATER COOLED INTERNAL COMBUSTION ENGINE CYLINDER

Application filed March 19, 1931, Serial No. 523,777, and in Switzerland March 31, 1930.

This invention relates to water cooled internal combustion engine cylinders and has for its object to provide a simple and improved construction having means whereby solid matter precipitated from the water can be removed.

According to this invention the jacket for the cooling water in addition to having an outlet opening towards its upper end is provided with a discharge port or conduit leading from the lowest point of the jacket, for the purpose of discharging therefrom solid matter precipitated from the cooling water, so that undue accumulation of deposits which would tend to impair efficient cooling can be prevented.

One construction according to the invention is illustrated by way of example in the accompanying drawing as applied to a double acting engine cylinder. In the construction illustrated the cylinder comprises a liner $a$, cylinder heads $d$ and an outer wall $b$ so constructed as to provide a chamber or water jacket $c$ for the cooling water. The water is supplied to the jacket $c$ through pipes $e$ and $f$ and is discharged therefrom through an outlet $g$ at the upper end of the jacket. In accordance with the present invention a discharge conduit $h$ is provided communicating with the lowest point of the cooling jacket $c$ so that solid matter precipitated from the cooling water can be discharged and the accumulation of solid matter which would otherwise impair effective cooling is thus prevented.

I claim:

1. In a vertical, water-cooled cylinder for internal-combustion engines, a water-jacket having at the top an inlet for the cooling water and an outlet therefor, and having at the lower part of the cylinder another inlet for the water, and a discharge port at the lowest point of the jacket for continuously discharging therethrough, by the cooling-circulation, the slurry continuously forming.

2. In a vertical, water-cooled cylinder for internal-combustion engines, a water-jacket having at the top an inlet for the cooling water and an outlet therefor, and having at the lower part of the cylinder another inlet for the water, and a discharge port at the lowest point of the jacket for continuously discharging therethrough, by the cooling-circulation, the slurry continuously forming, and a conduit connected to the discharge port for continuously entraining away the slurry forced thereinto by the circulation.

In testimony whereof I have affixed my signature.

OSCAR SIMMEN.